United States Patent
Takada

(10) Patent No.: US 10,035,218 B2
(45) Date of Patent: Jul. 31, 2018

(54) LASER MACHINING APPARATUS AND NUMERICAL CONTROL PROGRAM CREATION SOFTWARE

(71) Applicant: Mitsubishi Electric Corporation, Tokyo (JP)

(72) Inventor: Hiroko Takada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 51 days.

(21) Appl. No.: 15/323,500

(22) PCT Filed: Aug. 29, 2014

(86) PCT No.: PCT/JP2014/072814
§ 371 (c)(1),
(2) Date: Jan. 3, 2017

(87) PCT Pub. No.: WO2016/031069
PCT Pub. Date: Mar. 3, 2016

(65) Prior Publication Data
US 2017/0157702 A1    Jun. 8, 2017

(51) Int. Cl.
*B23K 26/03* (2006.01)
*B23K 26/38* (2014.01)
(Continued)

(52) U.S. Cl.
CPC ............ *B23K 26/03* (2013.01); *B23K 26/048* (2013.01); *B23K 26/0884* (2013.01);
(Continued)

(58) Field of Classification Search
CPC .. B23K 26/03; B23K 26/048; B23K 26/0884; B23K 26/0892; B23K 26/38
(Continued)

(56) References Cited

U.S. PATENT DOCUMENTS

2003/0183608 A1* 10/2003 Yamazaki .......... B23K 26/0853
219/121.83
2006/0081575 A1* 4/2006 Egawa .................. B23K 26/04
219/121.84
(Continued)

FOREIGN PATENT DOCUMENTS

CN      1759971 A    4/2006
CN    201073720 Y    6/2008
(Continued)

OTHER PUBLICATIONS

International Search Report of PCT/JP2014/072814 dated Nov. 25, 2014.
(Continued)

*Primary Examiner* — Kenneth M Lo
*Assistant Examiner* — Sivalingam Sivanesan
(74) *Attorney, Agent, or Firm* — Sughrue Mion, PLLC; Richard C. Turner

(57) ABSTRACT

A laser machining apparatus includes a height controller that performs an approach operation. The height controller uses a first approach speed and a first gain when performing the approach operation in a non-peripheral-edge portion of the workpiece, and uses a second approach speed lower than the first approach speed and a second gain lower than the first gain when performing the approach operation in a peripheral edge portion of the workpiece, and to make the time required when the approach operation is performed in the non-peripheral-edge portion of the workpiece shorter than the time required when the approach operation is performed in the peripheral edge portion of the workpiece.

8 Claims, 17 Drawing Sheets

(51) Int. Cl.
*B23K 26/08* (2014.01)
*G05B 19/29* (2006.01)
*G05B 19/406* (2006.01)
*G05B 19/416* (2006.01)
*B23K 26/04* (2014.01)
*B23K 101/18* (2006.01)

(52) U.S. Cl.
CPC .......... *B23K 26/0892* (2013.01); *B23K 26/38* (2013.01); *G05B 19/29* (2013.01); *G05B 19/406* (2013.01); *G05B 19/416* (2013.01); *B23K 2201/18* (2013.01); *G05B 2219/36199* (2013.01); *G05B 2219/50049* (2013.01)

(58) Field of Classification Search
USPC ........................................................ 700/166
See application file for complete search history.

(56) References Cited

U.S. PATENT DOCUMENTS

| | | | |
|---|---|---|---|
| 2013/0103183 A1* | 4/2013 | Mochida | G05B 19/19 700/186 |
| 2013/0112671 A1 | 5/2013 | Cathry et al. | |
| 2014/0312018 A1* | 10/2014 | Leslie | B23K 26/38 219/121.81 |

FOREIGN PATENT DOCUMENTS

| | | |
|---|---|---|
| CN | 102528288 A | 7/2012 |
| CN | 103003021 A | 3/2013 |
| CN | 103064338 A | 4/2013 |
| CN | 203401220 U | 1/2014 |
| JP | 05-006211 A | 1/1993 |
| JP | 09-308979 A | 12/1997 |
| JP | 2000-052076 A | 2/2000 |
| JP | 2006-110592 A | 4/2006 |
| JP | 2006-122939 A | 5/2006 |
| JP | 2010-012493 A | 1/2010 |
| JP | 2011-034501 A | 2/2011 |
| JP | 2011-235309 A | 11/2011 |
| JP | 2013-086172 A | 5/2013 |
| WO | 2013/071283 A1 | 5/2013 |

OTHER PUBLICATIONS

Communication dated Sep. 13, 2017, issued by the German Patent and Trademark Office in counterpart German Application No. 112014006909.4.

Communication dated Nov. 15, 2017, from State Intellectual Property Office of the P.R.C. in counterpart application No. 201480081568.9.

* cited by examiner

FIG.4

| | | AMOUNT OF TRAVEL OF MACHINING HEAD PER CONTROL PERIOD |
|---|---|---|
| DISTANCE BETWEEN NOZZLE AND WORKPIECE | 10 mm OR MORE | 1.67 mm |
| | 9 mm OR MORE AND LESS THAN 10 mm | 1.67 mm |
| | 8 mm OR MORE AND LESS THAN 9 mm | 1.50 mm |
| | 7 mm OR MORE AND LESS THAN 8 mm | 1.33 mm |
| | 6 mm OR MORE AND LESS THAN 7 mm | 1.17 mm |
| | 5 mm OR MORE AND LESS THAN 6 mm | 1.00 mm |
| | 4 mm OR MORE AND LESS THAN 5 mm | 0.83 mm |
| | 3 mm OR MORE AND LESS THAN 4 mm | 0.67 mm |
| | 2 mm OR MORE AND LESS THAN 3 mm | 0.50 mm |
| | 1 mm OR MORE AND LESS THAN 2 mm | 0.33 mm |
| | LESS THAN 1 mm | 0.17 mm |

FIG.5

| | | AMOUNT OF TRAVEL OF MACHINING HEAD PER CONTROL PERIOD |
|---|---|---|
| DISTANCE BETWEEN NOZZLE AND WORKPIECE | 10 mm OR MORE | 0.83 mm |
| | 9 mm OR MORE AND LESS THAN 10 mm | 0.42 mm |
| | 8 mm OR MORE AND LESS THAN 9 mm | 0.38 mm |
| | 7 mm OR MORE AND LESS THAN 8 mm | 0.33 mm |
| | 6 mm OR MORE AND LESS THAN 7 mm | 0.29 mm |
| | 5 mm OR MORE AND LESS THAN 6 mm | 0.25 mm |
| | 4 mm OR MORE AND LESS THAN 5 mm | 0.21 mm |
| | 3 mm OR MORE AND LESS THAN 4 mm | 0.17 mm |
| | 2 mm OR MORE AND LESS THAN 3 mm | 0.13 mm |
| | 1 mm OR MORE AND LESS THAN 2 mm | 0.083 mm |
| | LESS THAN 1 mm | 0.042 mm |

FIG.6

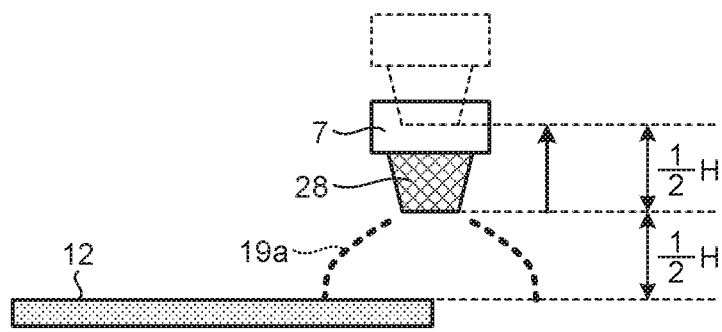

FIG.10

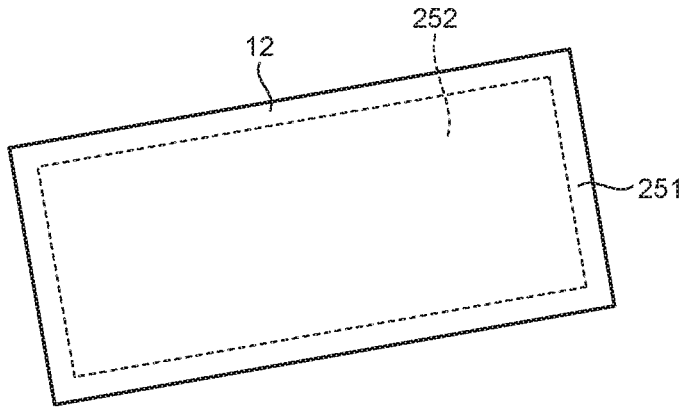

FIG.11

| | | AMOUNT OF TRAVEL OF MACHINING HEAD PER CONTROL PERIOD |
|---|---|---|
| DISTANCE BETWEEN NOZZLE AND WORKPIECE | 10 mm OR MORE | 0.42 mm |
| | 9 mm OR MORE AND LESS THAN 10 mm | 0.42 mm |
| | 8 mm OR MORE AND LESS THAN 9 mm | 0.38 mm |
| | 7 mm OR MORE AND LESS THAN 8 mm | 0.33 mm |
| | 6 mm OR MORE AND LESS THAN 7 mm | 0.29 mm |
| | 5 mm OR MORE AND LESS THAN 6 mm | 0.25 mm |
| | 4 mm OR MORE AND LESS THAN 5 mm | 0.21 mm |
| | 3 mm OR MORE AND LESS THAN 4 mm | 0.17 mm |
| | 2 mm OR MORE AND LESS THAN 3 mm | 0.13 mm |
| | 1 mm OR MORE AND LESS THAN 2 mm | 0.083 mm |
| | LESS THAN 1 mm | 0.042 mm |

FIG.12

| | | AMOUNT OF TRAVEL OF MACHINING HEAD PER CONTROL PERIOD |
|---|---|---|
| DISTANCE BETWEEN NOZZLE AND WORKPIECE | 10 mm OR MORE | 1.67 mm |
| | 9 mm OR MORE AND LESS THAN 10 mm | 0.42 mm |
| | 8 mm OR MORE AND LESS THAN 9 mm | 0.38 mm |
| | 7 mm OR MORE AND LESS THAN 8 mm | 0.33 mm |
| | 6 mm OR MORE AND LESS THAN 7 mm | 0.29 mm |
| | 5 mm OR MORE AND LESS THAN 6 mm | 0.25 mm |
| | 4 mm OR MORE AND LESS THAN 5 mm | 0.21 mm |
| | 3 mm OR MORE AND LESS THAN 4 mm | 0.17 mm |
| | 2 mm OR MORE AND LESS THAN 3 mm | 0.13 mm |
| | 1 mm OR MORE AND LESS THAN 2 mm | 0.083 mm |
| | LESS THAN 1 mm | 0.042 mm |

FIG.22

| COMMAND | OPERATION CONTENTS |
|---|---|
| G90G00X POSITION A Y POSITION A<br>G00X POSITION B Y POSITION B<br>M200<br>M120<br>G01X_Y_<br>...<br>M121<br>M199<br>G00 X POSITION C Y POSITION C<br>M198<br>M120<br>G01X_Y_<br>...<br>M121<br>M199<br>G00 X POSITION D Y POSITION D<br>M200<br>M120<br>G01X_Y_<br>...<br>M121<br>M199 | MOVE TO POSITION A<br>MOVE TO POSITION B<br>APPROACH AT APPROACH SPEED AND WITH GAIN FOR PERIPHERAL EDGE PORTION<br>BEAM ON<br>MACHINE B SHAPE<br>BEAM OFF<br>RAISE ON Z AXIS<br>MOVE TO POSITION C<br>APPROACH AT APPROACH SPEED AND WITH GAIN FOR NON-PERIPHERAL-EDGE PORTION<br>BEAM ON<br>MACHINE C SHAPE<br>BEAM OFF<br>RAISE ON Z AXIS<br>MOVE TO POSITION D<br>APPROACH AT APPROACH SPEED AND WITH GAIN FOR PERIPHERAL EDGE PORTION<br>BEAM ON<br>MACHINE D SHAPE<br>BEAM OFF<br>RAISE ON Z AXIS |

LASER MACHINING APPARATUS AND NUMERICAL CONTROL PROGRAM CREATION SOFTWARE

CROSS REFERENCE TO RELATED APPLICATIONS

This application is a National Stage of International Application No. PCT/JP2014/072814 filed Aug. 29, 2014, the contents of which is incorporated herein by reference in their entirety.

FIELD

The present invention relates to a laser machining apparatus and numerical control program creation software.

BACKGROUND

Conventionally, laser machining devices for laser machining a workpiece, which is a plate-shaped object to be worked on, to cut out a plurality of products move a machining head to a machining position of the next product each time laser machining of a product is completed for sequential laser machining.

An operation of bringing a machining head that has moved to a machining position close to a workpiece is called an approach operation. In the approach operation, by monitoring an electrostatic capacitance profiling voltage that varies depending on the distance between a nozzle provided at the machining head and a workpiece, the machining head is positioned in a position in which the nozzle is at a first distance from the workpiece.

During the approach operation, after the machining head approaches the workpiece until the distance between the nozzle and the workpiece becomes a second distance larger than the first distance, the amount of travel of the machining head per control period is decreased as the distance from the workpiece becomes smaller, so that the machining head can be positioned with high accuracy in a position in which the nozzle is at the first distance from the workpiece. The travel speed of the machining head when the nozzle is at the second distance or more from the workpiece is called an approach speed, and a ratio used for determining the amount of travel per period after the distance between the nozzle and the workpiece becomes less than the second distance, a gain.

The detection range of the electrostatic capacitance profiling voltage is fixed at a circular region of a fixed size centered around the machining head. Therefore, when the approach operation is performed in a peripheral edge portion of a workpiece, for example, the workpiece is present only in a part of the detection range. In the state where the workpiece is present only in a part of the detection range, even when the distance between the machining head and the workpiece is the same, the electrostatic capacitance profiling voltage decreases, compared to a case where the approach operation is performed in a central portion of the workpiece. Consequently, when the approach operation is performed in the peripheral edge portion of the workpiece with the approach speed and the gain set the same, the machining head is positioned where the distance between the nozzle and the workpiece smaller than the first distance. In that case, an occurrence of an overshoot causes the nozzle to strike the workpiece. When the nozzle strikes the workpiece, it is required to move the machining head away from the workpiece and then bring it close to the workpiece so that the approach operation takes time.

A technique intended to prevent overshoots during an approach operation is disclosed in Patent Literature 1.

An invention disclosed in Patent Literature 1 determines a positional deviation amount, the difference between a position command and the actual position of a servomotor, and changes a position gain to a corrected position gain based on the positional deviation amount to avoid striking of a nozzle on a workpiece due to an overshoot.

CITATION LIST

Patent Literature

Japanese Patent Application Laid-Open No. 2013-86172

SUMMARY

Technical Problem

During the approach operation, it is desirable to move a machining head as fast as possible to enhance production efficiency. During the approach operation in a central portion of a workpiece, the distance between the machining head and the workpiece can be detected accurately based on the electrostatic capacitance profiling voltage so that an overshoot is unlikely to cause the nozzle to strike the workpiece even when the machining head is moved fast. The invention disclosed in Patent Literature 1 performs the same approach operation, regardless of whether a location where the approach operation is performed is a non-peripheral-edge portion or a peripheral edge portion of a workpiece. Consequently, the invention disclosed in Patent Literature 1 takes a time more than necessary for the approach operation in the non-peripheral-edge portion of the workpiece when the approach operation is performed under a condition that prevents striking of the nozzle on the workpiece, and thus further improvement in production efficiency is desired.

The present invention has been made in view of the above, and has an object of preventing striking of a nozzle on a workpiece when the approach operation is performed in a peripheral edge portion of the workpiece, and making the time required to perform the approach operation in a non-peripheral-edge portion of the workpiece shorter than the time required to perform the approach operation in a peripheral edge portion of the workpiece.

Solution to Problem

To solve the above problem and achieve an object, there is provided a laser machining apparatus according to an aspect of the present invention that performs an approach operation in which a machining head having a nozzle is brought close to a workpiece to set a distance between the nozzle and the workpiece at a first distance, and emits a laser beam generated by a laser oscillator from the nozzle to the workpiece with the nozzle at the first distance from the workpiece, to cut out a part from the workpiece, the machine including: a sensor that measures the distance between the nozzle and the workpiece; and a height controller that performs the approach operation such that, when the distance between the nozzle and the workpiece is more than or equal to a second distance that is larger than the first distance, the machining head is brought close to the workpiece at an approach speed, and when the distance between the nozzle and the workpiece becomes less than or equal to the second distance, the machining head is brought close to the workpiece until the distance between the nozzle and the workpiece becomes the first distance with an amount of travel of the machining head per control period set, based on a gain, smaller than that during travel at the approach speed, wherein the height controller uses a first approach speed and a first gain when performing the approach operation in a non-peripheral-edge portion of the workpiece in which the workpiece is present in an entire detection range of the sensor, and uses a second approach speed lower than the first approach speed and a second gain lower than the first gain when performing the approach operation in a peripheral edge portion of the workpiece in which the workpiece is present in a part of the detection range.

Advantageous Effects of Invention

The laser machining apparatus according to the present invention achieves an effect of being able to prevent striking of the nozzle on a workpiece when the approach operation is performed in a peripheral edge portion of the workpiece, and to make the time required to perform the approach operation in a non-peripheral-edge portion of the workpiece shorter than the time required to perform the approach operation in the peripheral edge portion of the workpiece.

BRIEF DESCRIPTION OF DRAWINGS

FIG. 4 is an explanatory chart illustrating the amount of travel of a machining head per control period.

FIG. 5 is an explanatory chart illustrating the amount of travel of the machining head per control period.

FIG. 6 is a schematic diagram illustrating an example of height correction of the machining head.

FIG. 10 is a schematic diagram illustrating an example of the boundary between a non-peripheral-edge portion and a peripheral edge portion.

FIG. 11 is an explanatory chart illustrating the amount of travel of a machining head per control period.

FIG. 12 is an explanatory chart illustrating the amount of travel of the machining head per control period.

FIG. 22 is an explanatory chart illustrating an example of a numerical control program created by a numerical control program creation unit.

DESCRIPTION OF EMBODIMENTS

Hereinafter, embodiments of a laser machining apparatus and numerical control program creation software according to the present invention will be described in detail with reference to the drawings. The embodiments are not intended to limit the present invention.

First Embodiment

Figure 1:
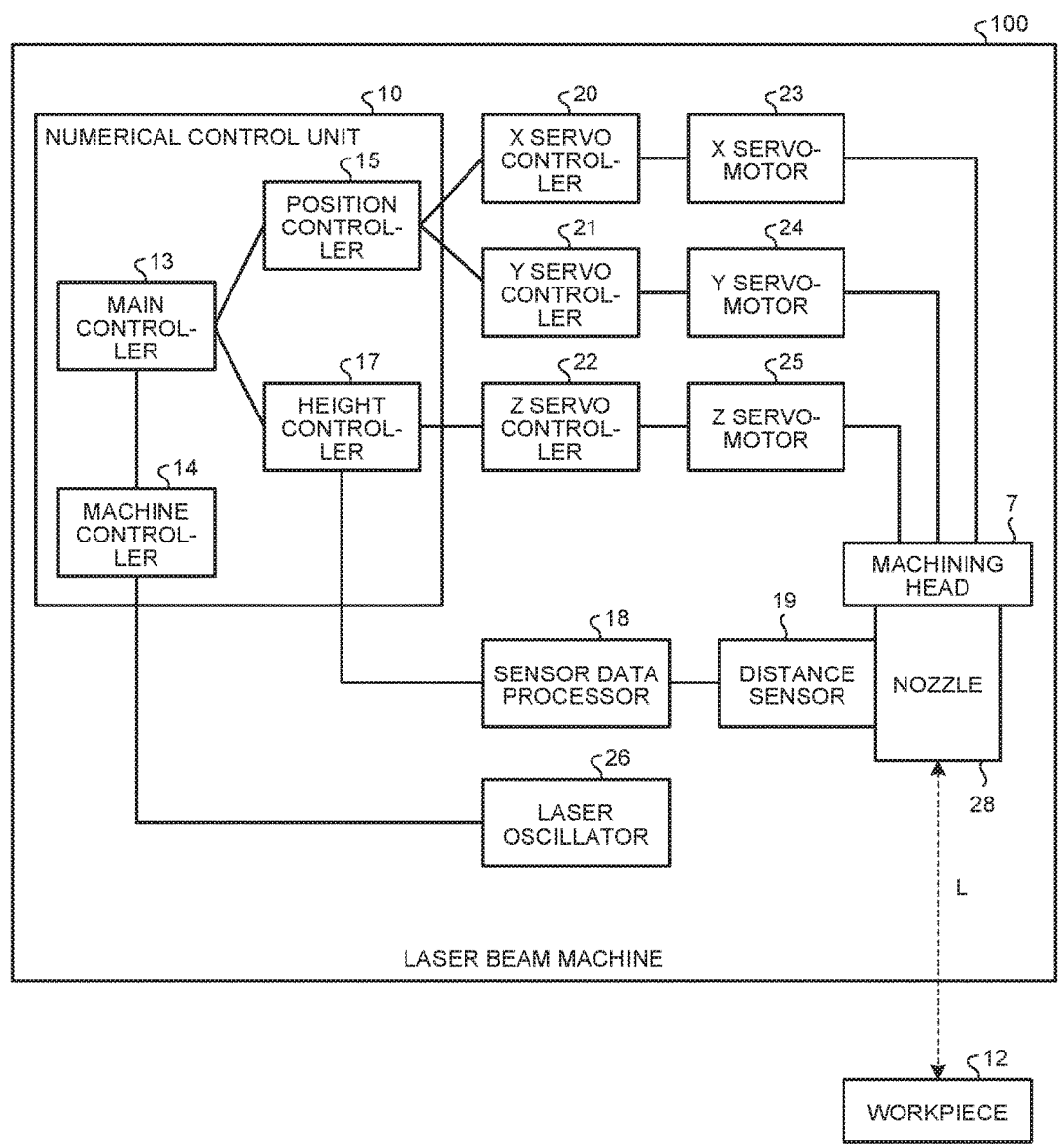
FIG. 1 is a configuration diagram of a laser machining apparatus according to a first embodiment of the present invention.

FIG. 1 is a configuration diagram of a laser machining apparatus according to a first embodiment of the present invention. A laser machining apparatus 100 includes a numerical control unit 10, a sensor data processor 18, a distance sensor 19, an X servo controller 20, a Y servo controller 21, a Z servo controller 22, an X servomotor 23, a Y servomotor 24, a Z servomotor 25, and a laser oscillator 26. The numerical control unit 10 has a main controller 13, a machine controller 14, a position controller 15, and a height controller 17.

The main controller 13 controls the operation of the entire laser machining apparatus 100. The machine controller 14 sends commands to the laser oscillator 26 and performs on-off control of a laser beam. The position controller 15 and the height controller 17 output position commands in the respective directions of the XYZ axes to the X servo controller 20, the Y servo controller 21, and the Z servo controller 22.

The distance sensor 19 is a capacitance type sensor, and measures an electrostatic capacitance profiling voltage, a voltage value corresponding to electrostatic capacitance between a nozzle 28 and a workpiece 12. The sensor data processor 18 acquires a voltage value from the distance sensor 19 to calculate a distance L between the nozzle 28 and the workpiece 12. The distance sensor 19 and the sensor data processor 18 constitute a sensor that measures the distance between the nozzle 28 and the workpiece 12.

The X servo controller 20 outputs the amount of travel in the X-axis direction to the X servomotor 23 to move a machining head 7 along the X axis. The Y servo controller 21 outputs the amount of travel in the Y-axis direction to the Y servomotor 24 to move the machining head 7 along the Y axis. The Z servo controller 22 outputs the amount of travel in the Z-axis direction to the Z servomotor 25 to move the machining head 7 along the Z axis. The X servomotor 23, the Y servomotor 24, and the Z servomotor 25 have a position detector on the respective XYZ axes, and move the machining head 7 according to the amount of travel on the respective XYZ axes fed from the X servo controller 20, the Y servo controller 21, and the Z servo controller 22.

The laser oscillator 26 turns on or off laser light used for machining the workpiece 12, based on commands from the machine controller 14.

Control when machining is performed according to a numerical control program will be described with reference to FIG. 1. The main controller 13 analyzes a numerical control program for laser machining, and provides information corresponding to command contents of the program to the machine controller 14, the position controller 15, and the height controller 17.

When a program command is a command to the laser oscillator 26, the main controller 13 provides a command to the machine controller 14. An example of the command to the laser oscillator 26 is to turn laser light on/off. A signal from the laser oscillator 26 is transmitted to the main controller 13 via the machine controller 14. Thus, the numerical control unit 10 can recognize the state of the laser oscillator 26.

When a program command is a position command, the main controller 13 provides information on a travel position and a travel speed to the position controller 15. The position controller 15 calculates a travel distance based on the information provided, distributes it to the X and Y axes, and outputs amounts of travel to the X servo controller 20 and the Y servo controller 21, respectively. The position controller 15 also performs management of the actual position of the machining head 7 based on an outputted travel position and information from the X servo controller 20 and the Y servo controller 21. The X servo controller 20 and the Y servo controller 21 drive the X servomotor 23 and the Y servomotor 24 to move the machining head 7 relative to the workpiece 12. By the machining head 7 traveling while emitting a laser beam from the nozzle 28 according to commands of the numerical control program, laser machining is performed. The position controller 15 transmits information on a travel position, the amount of travel, and the remaining travel distance to the main controller 13.

When a program command is a command to turn on/off a trace function, the main controller 13 provides command information to the height controller 17. When commanded to turn the trace function on, the height controller 17 executes the trace function to keep the distance between the nozzle 28 and the workpiece 12 at a first distance. When executing the trace function, the height controller 17 compares information on the distance L fed from the sensor data processor 18 to the preset first distance, and outputs an amount of travel to the Z servo controller 22 to eliminate the difference. The Z servo controller 22 drives the Z servomotor 25 to move the machining head 7 vertically. The distance sensor 19 outputs sensor data corresponding to the distance L between the nozzle 28 and the workpiece 12. The sensor data is fed back to the height controller 17 via the sensor data processor 18. As above, when the distance L changes due to a warp in the workpiece 12, sensor data changes, and by changing the Z-axis position based on the change in the sensor data, the distance L between the machining head 7 and the workpiece 12 is constantly kept at the first distance. The height controller 17 transmits information on the trace status to the main controller 13.

When a program command is a command to execute an approach operation, the main controller 13 provides information on an approach speed and a nozzle height to the height controller 17. The height controller 17 calculates a travel distance based on the information provided, and when commanded to execute the approach operation, outputs an amount of travel in the Z-axis direction to the Z servo controller 22. The Z servo controller 22 drives the Z servomotor 25 based on the amount of travel in the Z-axis direction provided from the height controller 17 to move the machining head 7 downward. The distance sensor 19 outputs sensor data corresponding to the distance L between the nozzle 28 and the workpiece 12. The sensor data is fed back to the height controller 17 via the sensor data processor 18. The height controller 17 lowers the machining head 7 until the distance L between the nozzle 28 and the workpiece 12 becomes the first distance based on the sensor data fed back from the sensor data processor 18.

In the approach operation, the height controller 17 receives a result of measuring the distance L between the nozzle 28 and the workpiece 12 from the sensor data processor 18. The height controller 17 decreases the amount of travel per control period of the machining head 7 when the nozzle 28 approaches the workpiece 12 until the nozzle 28 reaches a second distance larger than the first distance. This can make it possible to stop the machining head 7 with the nozzle 28 is away from the workpiece 12 by the first distance even when the first distance is smaller than the amount of travel of the machining head 7 per control period when the machining head 7 is moved at the approach speed.

Before the start of laser machining, an approach speed and a gain, parameters for executing the approach operation, are set in the laser machining apparatus 100. The approach speed is a travel speed to bring the machining head 7 close to the workpiece 12. The gain is a factor of the amount of travel per control period when the machining head 7 is reduced in speed after the nozzle 28 approaches the workpiece 12 within the second distance.

In the first embodiment, when the approach operation is performed in a peripheral edge portion of the workpiece 12, both of the approach speed and the gain are set at values lower than those of when the approach operation is performed in a non-peripheral-edge portion of the workpiece 12. Specifically, when the approach operation is performed in the non-peripheral-edge portion of the workpiece 12, the height controller 17 uses a first approach speed and a first gain, and when the approach operation is performed in the peripheral edge portion of the workpiece 12, the height controller 17 uses a second approach speed lower than the first approach speed and a second gain lower than the first gain.

Figure 2:
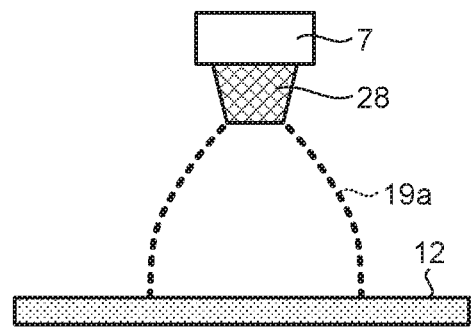
FIG. 2 is a schematic diagram illustrating a workpiece included in the detection range of a distance sensor when an approach operation is performed in a non-peripheral-edge portion of the workpiece.

First, the reason why conditions of the approach operation are changed between the peripheral edge portion and the non-peripheral-edge portion of the workpiece 12 will be described. A detection range 19a of the distance sensor 19 is within a circular range centered around the nozzle 28. FIG. 2 is a schematic diagram illustrating the workpiece included in the detection range of the distance sensor when the approach operation is performed in the non-peripheral-edge portion of the workpiece. Because the workpiece 12 is present in the entire detection range 19a of the distance sensor 19, an electrostatic capacitance profiling voltage corresponding to electrostatic capacitance generated between a part of the workpiece 12 corresponding to the area of the detection range and the nozzle 28, is detected by the distance sensor 19.

Figure 3:
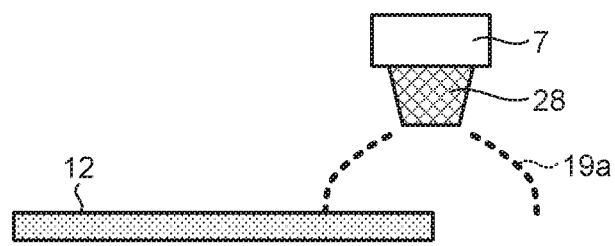
FIG. 3 is a schematic diagram illustrating a workpiece included in the detection range of the distance sensor when the approach operation is performed in a peripheral edge portion of the workpiece.

FIG. 3 is a schematic diagram illustrating the workpiece included in the detection range of the distance sensor when the approach operation is performed in the peripheral edge portion of the workpiece. When the approach operation is performed around a side of the workpiece 12, the workpiece 12 is present only in half of the detection range 19a of the distance sensor 19. Therefore, when the distance between the nozzle 28 and the workpiece 12 is the same, electrostatic capacitance generated between the nozzle 28 and the workpiece 12 is half. Consequently, when the approach operation is performed around the side of the workpiece 12, the actual distance between the nozzle 28 and the workpiece 12 is half the distance detected by the sensor data processor 18 based on sensor data of the distance sensor 19.

Here, the approach operation around a side of the workpiece 12 has been described as an example. When the approach operation is performed around four corners of the workpiece 12, the actual distance between the nozzle 28 and the workpiece 12 is a quarter of the distance detected by the sensor data processor 18 based on sensor data of the distance sensor 19. In either case, when the approach operation is performed in a state where the workpiece 12 is not present in a part of the detection range 19a of the distance sensor 19, the actual distance between the nozzle 28 and the workpiece 12 has a value lower than that of the distance detected by the sensor data processor 18 based on sensor data of the distance sensor 19.

FIG. 4 is an explanatory chart illustrating the amount of travel of the machining head 7 per control period, illustrating the amount of travel of the machining head 7 per control period during the approach operation at an approach speed=20 m/min, and with a gain=1.0. In the first embodiment, assume that the control period of the laser machining apparatus 100 is set at 0.0050 sec. In the example provided here, the second distance is set at 10 mm. When the distance between the nozzle 28 and the workpiece 12 becomes less than 10 mm, the height controller 17 changes the travel speed of the machining head 7 per control period. To explain how to see FIG. 4, a case where the distance between the nozzle 28 and the workpiece 12 is more than or equal to 3 mm and less than 4 mm is taken as an example. It is illustrated that the amount of travel of the machining head 7 per control period while the distance between the nozzle 28 and the workpiece 12 goes from 4 mm to 3 mm is 0.67 mm.

When the distance between the nozzle 28 and the workpiece 12 is 10 mm or more, the machining head 7 travels at the approach speed, that is, at a speed of 20 m/min. Therefore, the amount of travel of the machining head 7 per control period when the distance between the nozzle 28 and the workpiece 12 is 10 mm or more is 1.67 mm.

The height controller 17 starts speed reduction control on the travel speed of the machining head 7 at the point in time when the sensor data processor 18 detects that the distance L between the nozzle 28 and the workpiece 12 becomes less than 10 mm, which is the second distance, based on sensor data of the distance sensor 19. However, when the gain=1.0, the amount of travel of the machining head 7 per control period when the distance L between the nozzle 28 and the workpiece 12 is 9 mm or more and less than 10 mm is equal to that of when the distance between the nozzle 28 and the workpiece 12 is 10 mm or more. Thus, in actuality, the travel speed of the machining head 7 is changed at the point in time when the distance L between the nozzle 28 and the workpiece 12 becomes less than 9 mm.

Typically, a delay in following a position command occurs in servomotors. Thus, a delay in following a position command also occurs in the Z servomotor 25 that drives the machining head 7 in the Z direction. In the approach operation at the approach speed=20 m/min, and with the gain=1.0, the amount of travel of the machining head 7 per control period is a little over one-sixth of the distance L between the nozzle 28 and the workpiece 12. Therefore, even if the machining head 7 overshoots, the nozzle 28 does not strike the workpiece 12 when a delay of the Z servomotor 25 in following a position command is five control periods or less.

When the approach operation is performed in the non-peripheral-edge portion of the workpiece 12, the distance L between the nozzle 28 and the workpiece 12 can be detected accurately by the distance sensor 19 and the sensor data processor 18. Therefore, when the approach operation is performed under conditions that the approach speed=20 m/min, and the gain=1.0 in the non-peripheral-edge portion of the workpiece 12, the nozzle 28 does not strike the workpiece 12 when a delay of the Z servomotor 25 in following a position command is five control periods or less.

However, when the approach operation is performed around a side of the workpiece 12, the distance L between the nozzle 28 and the workpiece 12 is half the distance detected by the sensor data processor 18 based on sensor data of the distance sensor 19. Consequently, when the approach operation is performed around a side of the workpiece 12, the height controller 17 reduces the travel speed of the machining head 7 at the point in time when the distance L between the nozzle 28 and the workpiece 12 becomes less than 4.5 mm. When the approach operation is performed under conditions that the approach speed=20 m/min, and the gain=1.0, only a delay of three control periods of the Z servomotor 25 in following a position command causes the nozzle 28 to strike the workpiece 12. When the nozzle 28 strikes the workpiece 12, the approach operation is redone again after raising the machining head 7. Thus the time required for the approach operation increases.

Therefore, when the approach operation is performed in the peripheral edge portion of the workpiece, the approach operation need to be performed under conditions different from those of the non-peripheral-edge portion to prevent the nozzle 28 from striking the workpiece 12 due to an overshoot.

In the first embodiment, when the approach operation is performed in the peripheral edge portion of the workpiece 12, both the approach speed and the gain are set lower than those of when the approach operation is performed in the non-peripheral-edge portion of the workpiece 12.

Specifically, for the approach operation in the peripheral edge portion of the workpiece 12, both the approach speed and the gain are set at values lower than values used in the approach operation in the non-peripheral-edge portion. For example, in the approach operation in the non-peripheral-edge portion, the first approach speed=20 m/min and the first gain=1.0 are used, and in the approach operation in the peripheral edge portion, the second approach speed=10 m/min and the second gain=0.5 are used.

FIG. 5 is an explanatory chart illustrating the amount of travel of the machining head 7 per control period, specifically, illustrating the amount of travel of the machining head 7 per control period during the approach operation at the approach speed=10 m/min, and with the gain=0.5. As described above, the control period of the laser machining apparatus 100 is 0.0050 sec. With the approach speed=10 m/min, and the gain=0.5, the machining head 7 travels 0.83 mm during one control period until the distance L, which is between the nozzle 28 and the workpiece 12 detected by the sensor data processor 18 based on sensor data of the distance sensor 19, becomes less than 10 mm. Thus, the machining head 7 travels 0.83 mm per control period at a point in time immediately before the reduction in the travel speed of the machining head 7 is started. Thus, an overshoot caused by a following delay of ten control periods or less of the Z servomotor 25 does not cause the nozzle 28 to strike the workpiece 12.

With the approach speed=10 m/min, and the gain=0.5, the amount of travel of the machining head 7 per control period is 0.083 mm when the distance L between the nozzle 28 and the workpiece 12 is 1 mm or more and less than 2 mm. Thus, when the first distance is 1 mm, the positioning can be performed with an accuracy of 0.083 mm.

When the approach operation is performed in the peripheral edge portion of the workpiece 12, the distance between the nozzle 28 and the workpiece 12 becomes smaller than a target distance. Therefore, when the approach operation is performed in the peripheral edge portion of the workpiece 12, the distance L between the nozzle 28 and the workpiece 12 is corrected by raising the machining head 7 at the end.

In a specific example for explanation, when the workpiece 12 is present only in half of the detection range 19a of the distance sensor 19, the distance detected by the sensor data processor 18 based on sensor data of the distance sensor 19 is twice the actual distance. Thus, when the machining head 7 is attempted to move until the distance L between the nozzle 28 and the workpiece 12 becomes the first distance, the machining head 7 stops in a position in which the distance L between the nozzle 28 and the workpiece 12 is half the first distance. Therefore, by raising the machining head 7 by ½ of the first distance at the end of the approach operation, the distance L between the nozzle 28 and the workpiece 12 is set to the first distance.

FIG. 6 is a schematic diagram illustrating an example of height correction of the machining head. In the present example, the first distance is H. When the workpiece 12 is present only in half of the detection range 19a of the distance sensor 19, and the machining head 7 has stopped in a position in which the distance L between the nozzle 28 and the workpiece 12 is half the first distance H, a correction operation to raise the machining head 7 by ½ of the first distance H is performed at the end of the approach operation. Consequently, the corrected distance between the nozzle 28 and the workpiece 12 is the first distance H.

Likewise, when the workpiece 12 is present only in a quarter of the detection range 19a of the distance sensor 19, the distance detected by the sensor data processor 18 based on sensor data of the distance sensor 19 is four times the actual distance. Therefore, when the machining head 7 is attempted to move until the distance L between the nozzle 28 and the workpiece 12 becomes the first distance, the machining head 7 stops in a position in which the distance L between the nozzle 28 and the workpiece 12 is a quarter of the first distance. Therefore, by raising the machining head 7 by ¾ of the first distance at the end of the approach operation, the distance L between the nozzle 28 and the workpiece 12 is set to the first distance. By performing the correction operation to raise the machining head 7 based on the rate of the workpiece 12 included in the detection range 19a of the distance sensor 19 at the end of the approach operation, the machining head 7 can be positioned with the distance between the nozzle 28 and the workpiece 12 is at the first distance even in the approach operation in the peripheral edge portion of the workpiece 12.

Figure 7:
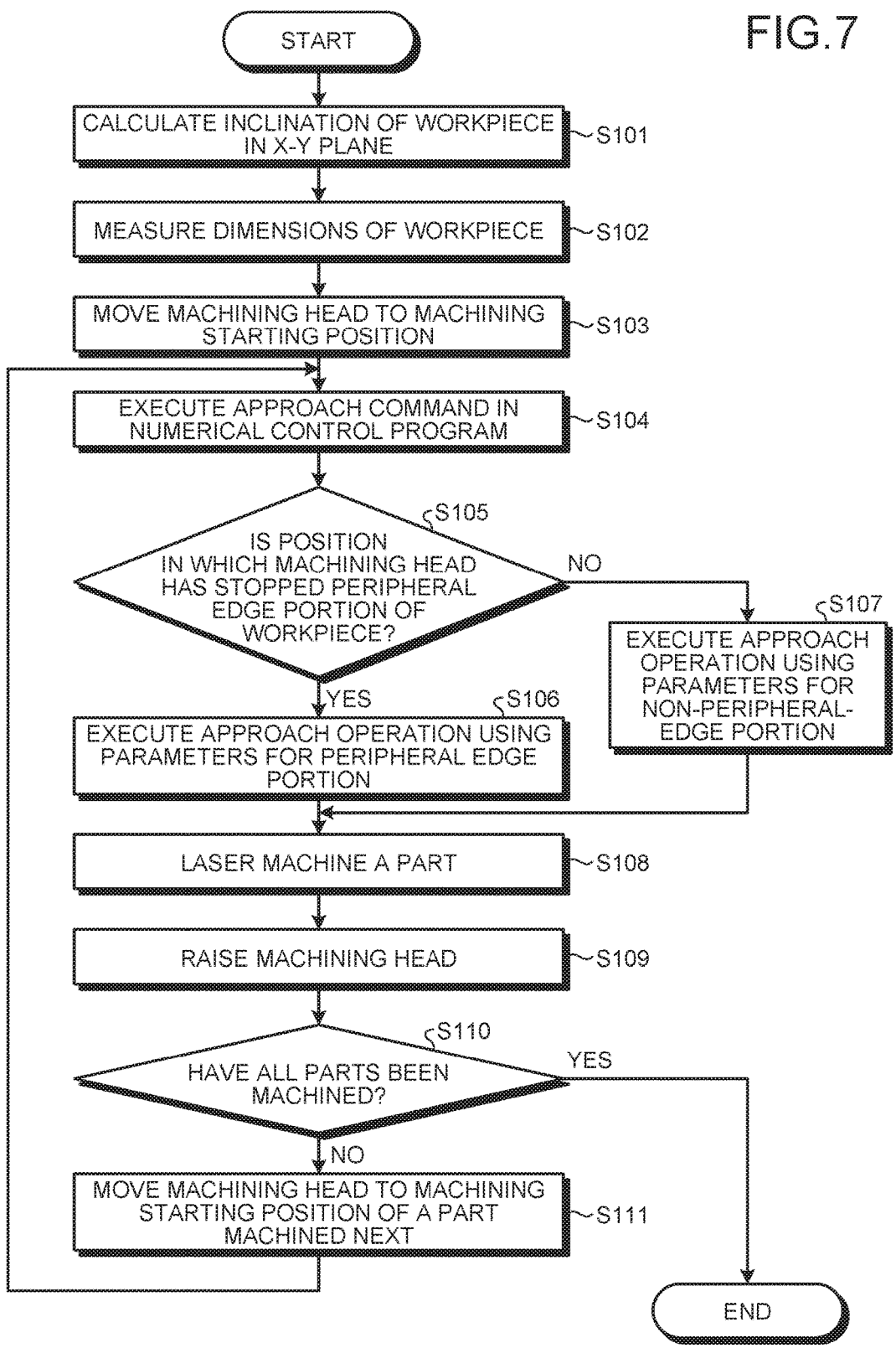
FIG. 7 is a flowchart illustrating the flow of operations during laser machining.

FIG. 7 is a flowchart illustrating the flow of operations during laser machining. A series of operations in the flowchart illustrated in FIG. 7 is on the assumption that the workpiece 12 has a rectangular shape.

Here, it is assumed that the first approach speed and the first gain, which are parameters for the approach operation in the non-peripheral-edge portion of the workpiece 12, are respectively set at an approach speed=20 m/min and a gain=1.0. On the other hand, it is assumed that the second approach speed and the second gain, which are parameters for the approach operation in the peripheral edge portion of the workpiece 12, are respectively set at an approach speed=10 m/min and a gain=0.5. The peripheral edge portion size has a value lower than that of the diameter of the detection range 19a of the distance sensor 19, and for example, is set at the same value as the radius of the detection range 19a of the distance sensor 19. Thus, in the peripheral edge portion of the workpiece 12, the workpiece 12 is present in a part of the detection range 19a of the distance sensor 19, and in the non-peripheral-edge portion of the workpiece 12, the workpiece 12 is present in the entire detection range 19a of the distance sensor 19. In the present example, it is assumed that the radius of the detection range of the distance sensor 19 is 10 mm, and the peripheral edge portion size is set at 10 mm.

Figure 8:
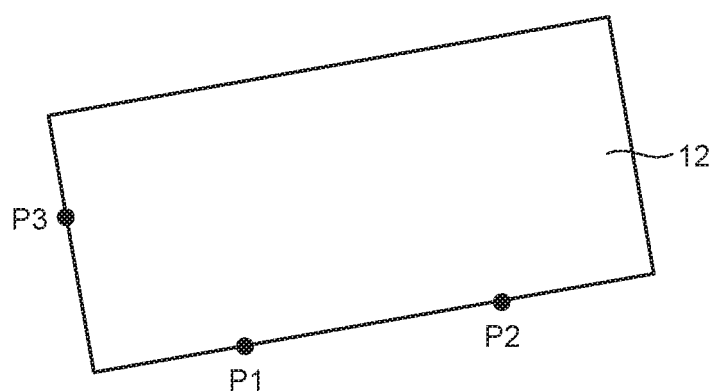
FIG. 8 is a conceptual diagram illustrating an example of measurement positions of machine coordinate positions on the outline of a workpiece.

When laser machining is started, the main controller 13 measures the machine coordinate positions of three points on the outline of the workpiece 12, thereby calculating the inclination of the workpiece 12 in an X-Y plane (step S101). Since the workpiece 12 has a rectangular shape, the inclination in the X-Y plane can be calculated by measuring three points on two adjacent sides. FIG. 8 is a conceptual diagram illustrating an example of the measurement positions of the machine coordinate positions on the outline of the workpiece. In an example illustrated in FIG. 8, the machine coordinate positions of a point P1 and a point P2 on a long side and a point P3 on a short side of the workpiece 12 are measured. The machine coordinate positions are mechanical coordinate positions of the laser machining apparatus 100 indicated by commands to the X servomotor 23 and the Y servomotor 24. Thus, in the following processing, the main controller 13 performs the processing with the inclination in the X-Y plane of the workpiece 12 is corrected.

Figure 9:
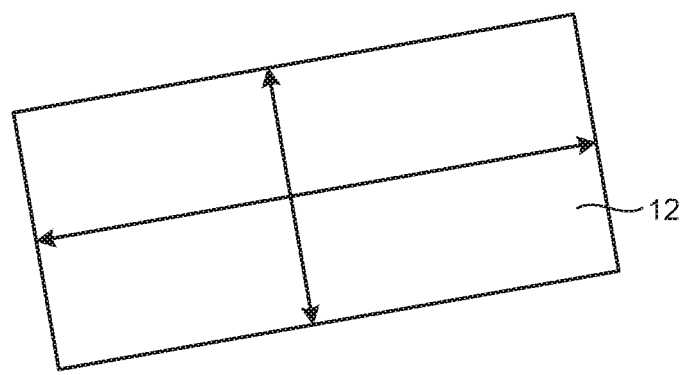
FIG. 9 is a conceptual diagram illustrating an example of dimension measurements of the outline of the workpiece.

Next, the main controller 13 measures the dimensions of the workpiece 12 (step S102). FIG. 9 is a conceptual diagram illustrating an example of dimension measurements of the outline of the workpiece. As illustrated in FIG. 9, since the workpiece 12 has a rectangular shape, longitudinal and lateral dimensions can be measured. When the dimensions of the workpiece 12 are measured, the inclination of the workpiece 12 in the X-Y plane calculated in step S101 is corrected to measure the actual longitudinal and lateral dimensions of the workpiece 12.

At the point in time when the measurements of the workpiece 12 are completed, the workpiece 12 can be distinguished into the non-peripheral-edge portion and the peripheral edge portion. FIG. 10 is a schematic diagram illustrating an example of the boundary between the non-peripheral-edge portion and the peripheral edge portion. In the present example, since the peripheral edge portion size is set at 10 mm. Accordingly, an outer peripheral portion 251, a region in a frame shape of 10 mm from the outline of the workpiece 12 constitutes the peripheral edge portion. Further, a central portion 252 that is a rectangular region except the outer peripheral portion 251 constitutes the non-peripheral-edge portion.

The main controller 13 moves the machining head 7 to a machining starting position according to a machining head travel command in the numerical control program (step S103).

After the machining head 7 is moved to the machining starting position, the main controller 13 executes an approach command included in the numerical control program (step S104). When executing the approach command, the main controller 13 determines whether the position in which the machining head 7 is stopped is in the peripheral edge portion of the workpiece 12 or not (step S105). That is, it determines whether the machining head 7 is stopped in the outer peripheral portion 251 of the workpiece 12 or not.

When the position in which the machining head 7 is stopped is in the peripheral edge portion of the workpiece 12 (step S105/Yes), the height controller 17 executes the approach operation using parameters for the peripheral edge portion based on a command from the main controller 13 (step S106). Specifically, the machining head 7 is brought close to the workpiece 12 at the approach speed=10 m/min and with the gain=0.5, and the machining head 7 is raised at the end to set the distance L between the nozzle 28 and the workpiece 12 to the first distance. When the position in which the machining head 7 is stopped is not in the peripheral edge portion of the workpiece 12 (step S105/No), the height controller 17 executes the approach operation using parameters for the non-peripheral-edge portion (step S107). Specifically, the machining head 7 is brought close to the workpiece 12 at the approach speed=20 m/min and with the gain=1.0 to set the distance L between the nozzle 28 and the workpiece 12 to the first distance.

After the machining head 7 is positioned with the distance L between the nozzle 28 and the workpiece 12 is the first distance, the main controller 13 laser machines a part according to the numerical control program (step S108). The laser machining is performed by moving the machining head 7 in the X-Y plane with the laser is turned on.

When laser machining for one part is completed and the laser is turned off, the main controller 13 raises the machining head 7 according to the numerical control program (step S109). When all parts have been machined (step S110/Yes), the laser machining on the workpiece 12 is ended. When all parts have not been machined (step S110/No), the main controller 13 moves the machining head 7 to a machining starting position of a part to be machined next according to a machining head travel command in the numerical control program (step S111). After step S111, the process proceeds to step S104 in which an approach command is executed.

The laser machining apparatus 100 according to the first embodiment changes the approach speed and the gain between when the approach operation is performed in the peripheral edge portion of the workpiece 12 and when the approach operation is performed in the non-peripheral-edge portion. Specifically, when the approach operation is performed in the non-peripheral-edge portion of the workpiece 12, the first approach speed and the first gain are used, and when the approach operation is performed in the peripheral edge portion of the workpiece 12, the second approach speed lower than the first approach speed and the second gain lower than the first gain are used. This can prevent the nozzle 28 from striking the workpiece 12 during an approach to the peripheral edge portion of the workpiece 12, and also can move the machining head 7 faster during an approach to the non-peripheral-edge portion of the workpiece 12 than during an approach to the peripheral edge portion to make the time required for the approach operation shorter than the time required for the approach operation in the peripheral edge portion.

Further, the utilization efficiency of the workpiece 12 can be improved since parts can be cut out from the peripheral edge portion of the workpiece 12.

Second Embodiment

The device configuration of a laser machining apparatus according to a second embodiment of the present invention is similar to that in the first embodiment. In the second embodiment, a height controller 17 uses a first approach speed and a first gain that are parameters for an approach operation in a non-peripheral-edge portion of a workpiece 12 when the approach operation is performed in the non-peripheral-edge portion of the workpiece 12. The height controller 17 uses a second approach speed and the first gain that are parameters for the approach operation in a peripheral edge portion of the workpiece 12 when the approach operation is performed in the peripheral edge portion of the workpiece 12. That is, the height controller 17 uses the first gain regardless of whether the approach operation is in the peripheral edge portion of the workpiece 12 or the approach operation is in the non-peripheral-edge portion of the workpiece 12. The second approach speed has a value lower than that of the first approach speed. In a specific example, the parameters for the approach operation in the non-peripheral-edge portion of the workpiece 12 are set such that the approach speed=20 m/min, and the gain=1.0, and the parameters for the approach operation in the peripheral edge portion of the workpiece 12 are set such that the approach speed=5 m/min, and the gain=1.0.

FIG. 11 is an explanatory chart illustrating the amount of travel of a machining head 7 per control period, specifically, illustrating the amount of travel of the machining head 7 per control period during the approach operation at the approach speed=5 m/min, and with the gain=1.0. In the second embodiment, the control period of the laser machining apparatus 100 is set at 0.0050 sec. The amount of travel of the machining head 7 per control period after the distance L between a nozzle 28 and the workpiece 12 detected by a sensor data processor 18 based on sensor data of a distance sensor 19 becomes less than 9 mm is the same as that in the approach operation at the approach speed=10 m/min, and with the gain=0.5 illustrated in FIG. 5. That is, when the approach operation is performed at the approach speed=5 m/min and with the gain=1.0, positioning in the direction of a Z axis can be performed with the same accuracy as that of when the approach speed=10 m/min and the gain=0.5.

When the approach speed=5 m/min and the gain=1.0, the machining head 7 travels 0.42 mm during one control period until the distance L between the nozzle 28 and the workpiece 12, which is detected by the sensor data processor 18 based on sensor data of the distance sensor 19, becomes less than 9 mm. That is, the machining head 7 travels 0.42 mm per control period immediately before the reduction of the travel speed of the machining head 7 is started. Accordingly, an overshoot due to a following delay of twenty-one control periods or less of a Z servomotor 25 does not cause the nozzle 28 to strike the workpiece 12.

Therefore, when the approach operation is performed in the peripheral edge portion of the workpiece 12, even if only the approach speed is reduced compared to the case where the approach operation is performed in the non-peripheral-edge portion of the workpiece 12, the nozzle 28 can be prevented from striking the workpiece 12 due to an overshoot.

When only the approach speed is reduced, it takes longer time until the machining head 7 reaches a position in which the distance L between the nozzle 28 and the workpiece 12 is a second distance. Specifically, when the approach speed=5 m/min and the gain=1.0, the amount of travel of the machining head 7 per control period of when the distance L between the nozzle 28 and the workpiece 12 is 10 mm or more is 0.42 mm. This amount of travel is half that of when the approach speed=10 m/min, and the gain=0.5. Therefore, when the approach speed=5 m/min and the gain=1.0, the time necessary for the machining head 7 to reach the position in which the distance L between the nozzle 28 and the workpiece 12 is the second distance is twice that of when the approach speed=10 m/min, and the gain=0.5.

Accordingly, reducing only the approach speed as in the second embodiment can provide an effect of preventing the striking of the nozzle 28 on the workpiece 12 due to an overshoot. However, reducing both the approach speed and the gain as in the first embodiment can provide an effect of allowing the time required for the approach operation to be reduced in addition to an effect of preventing the striking of the nozzle 28 on the workpiece 12 due to an overshoot.

Although the above explanation provides an example of reducing only the approach speed when the approach operation is performed in the peripheral edge portion of the workpiece 12, compared to the case where the approach operation is performed in the non-peripheral-edge portion of the workpiece 12, it is also possible to reduce only the gain. In the case where only the gain is reduced, the height controller 17 uses the first approach speed and the first gain that are parameters for the approach operation in the non-peripheral-edge portion of the workpiece 12 when the approach operation is performed in the non-peripheral-edge portion of the workpiece 12. The height controller 17 uses the first approach speed and a second gain that are parameters for the approach operation in the peripheral edge portion of the workpiece 12 when the approach operation is performed in the peripheral edge portion of the workpiece 12. That is, the height controller 17 uses the first approach speed regardless of whether the approach operation is in the peripheral edge portion of the workpiece 12 or the approach operation is in the non-peripheral-edge portion of the workpiece 12. The second gain has a value lower than that of the first gain. In a specific example, the parameters for the approach operation in the non-peripheral-edge portion of the workpiece 12 are set such that the approach speed=20 m/min and the gain=1.0, and the parameters for the approach operation in the peripheral edge portion of the workpiece 12 are set such that the approach speed=20 m/min and the gain=0.25.

FIG. 12 is an explanatory chart illustrating the amount of travel of the machining head 7 per control period, specifically illustrating the amount of travel of the machining head 7 per control period during the approach operation at the approach speed=20 m/min, and with the gain=0.25.

By reducing the gain, the amount of travel of the machining head 7 per control period is reduced so that the accuracy of positioning the machining head 7 to a target position is increased. Specifically, when the approach operation is performed at the approach speed=20 m/min and with the gain=0.25, the amount of travel of the machining head 7 per control period of when the distance L between the nozzle 28 and the workpiece 12 at 1 mm or more and less than 2 mm is 0.083 mm. Thus, when the first distance is 1 mm, the positioning on the Z axis can be performed with an accuracy of 0.083 mm.

In a case where only the gain is reduced when the approach operation is performed in the peripheral edge portion of the workpiece 12, compared to the case where the approach operation is performed in the non-peripheral-edge portion of the workpiece 12, it is preferable to set the second distance at a dimension that prevents the nozzle 28 from striking the workpiece 12 even when an overshoot occurs in consideration of following delay of the Z servomotor 25.

The laser machining apparatus 100 according to the second embodiment changes the approach speed or the gain between when the approach operation is performed in the peripheral edge portion of the workpiece 12 and when the approach operation is performed in the non-peripheral-edge portion. Specifically, when the approach operation is performed in the non-peripheral-edge portion of the workpiece 12, the first approach speed and the first gain are used, and when the approach operation is performed in the peripheral edge portion of the workpiece 12, the second approach speed lower than the first approach speed and the first gain is used, or the first approach speed and the second gain lower than the first gain are used. This can prevent the nozzle 28 from striking the workpiece 12 during an approach to the peripheral edge portion of the workpiece 12, and also can move the machining head 7 faster during an approach to the non-peripheral-edge portion of the workpiece 12 than during an approach to the peripheral edge portion, to make the time required for the approach operation shorter than that of when the approach operation is performed in the peripheral edge portion.

The above explanation provides an example of reducing only the approach speed without changing the gain, and an example of reducing only the gain without changing the approach speed, when the approach operation is performed in the peripheral edge portion of the workpiece 12, compared to the case where the approach operation is performed in the non-peripheral-edge portion of the workpiece 12. However, it is also possible to reduce the approach speed and increase the gain, and it is also possible to reduce the gain and increase the approach speed, compared to the case where the approach operation is performed in the non-peripheral-edge portion of the workpiece 12, if the amount of travel of the machining head 7 per control period is reduced compared to the case where the approach operation is performed in the non-peripheral-edge portion of the workpiece 12.

Third Embodiment

Figure 13:
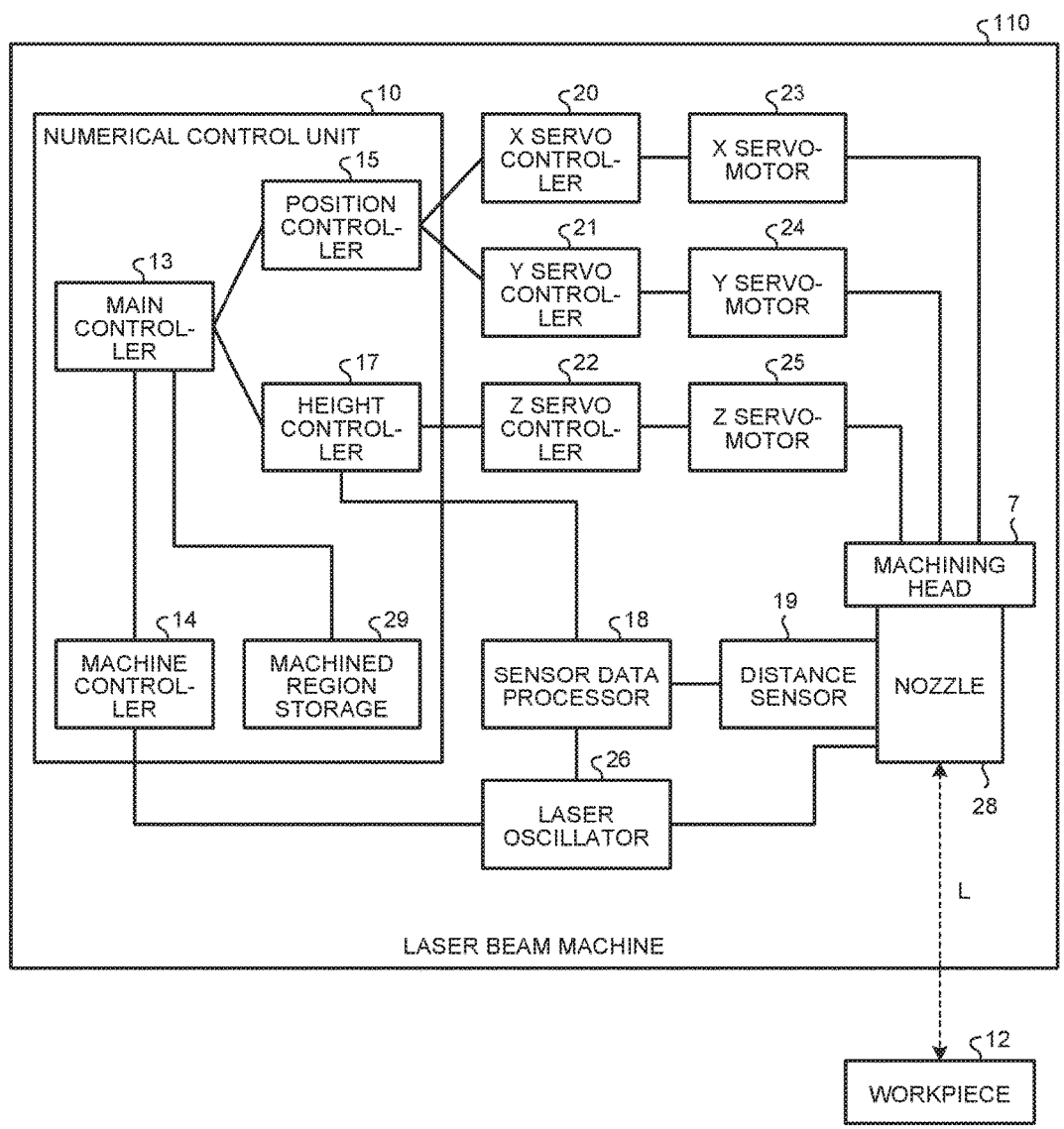
FIG. 13 is a configuration diagram of a laser machining apparatus according to a third embodiment of the present invention.

FIG. 13 is a configuration diagram of a laser machining apparatus according to a third embodiment of the present invention. The same portions as those in the first embodiment are denoted by the same reference numerals to omit their descriptions. A laser machining apparatus 110 according to the third embodiment further includes machined region storage 29 compared to the laser machining apparatus 100 in the first embodiment.

In the third embodiment, when an approach operation is performed on a machined region indicated by machined region information stored in the machined region storage 29, a height controller 17 performs the approach operation using a second approach speed and a second gain that are parameters for a peripheral edge portion.

Figure 14:
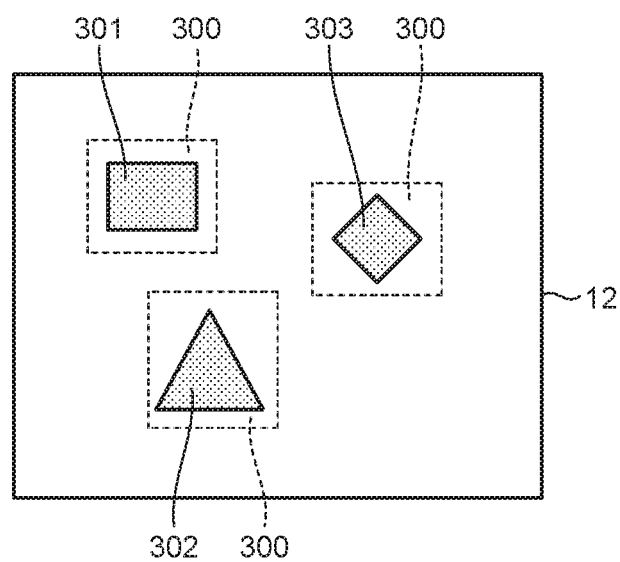
FIG. 14 is a schematic diagram illustrating an example of machined regions.

The machined region is a region in which laser machining has been performed to cut out a part, and is a region in a rectangular shape containing a region in which the part shape is enlarged by a peripheral edge portion size in XY directions. FIG. 14 is a schematic diagram illustrating an example of machined regions. Portions enclosed by broken lines in FIG. 14 are machined regions 300. The machined regions 300 have rectangular shapes with sides extending in the same directions as the longitudinal and lateral directions of a workpiece 12, regardless of the shapes and the orientations of parts cut out by laser machining. Specifically, not only around a portion from which a rectangular part 301 having sides parallel to the sides of the workpiece 12 is cut out, but also around portions from which a triangular part 302 and a rectangular part 303 having sides non-parallel to the sides of the workpiece 12 are cut out, the machined regions 300 are set in rectangular shapes with sides extending in the same directions as the longitudinal and lateral directions of the workpiece 12.

The machined region information is information indicating the positions of the machined regions 300 on the workpiece 12.

Figure 15:
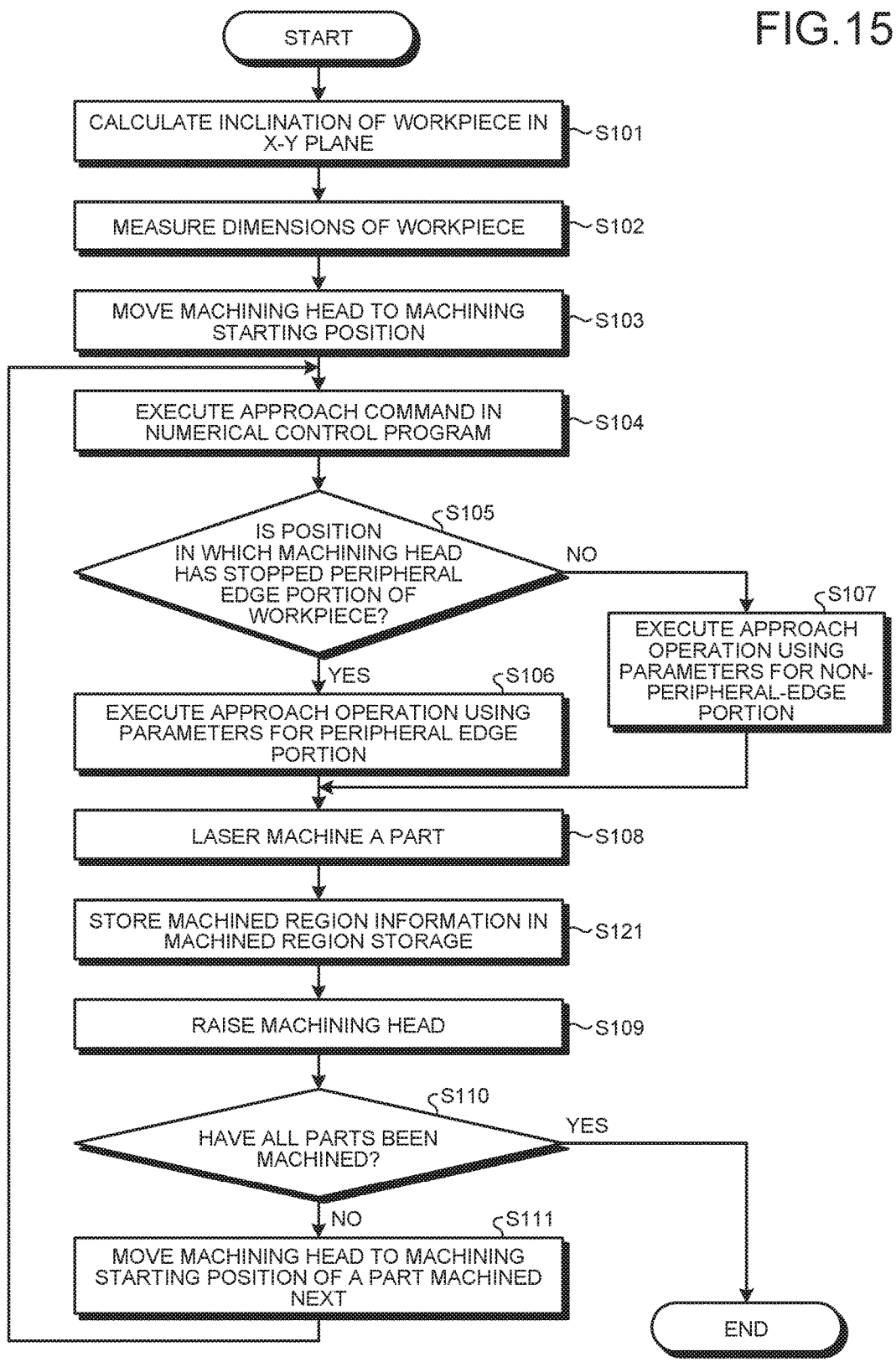
FIG. 15 is a flowchart illustrating the flow of operations during laser machining.

FIG. 15 is a flowchart illustrating the flow of operations during laser machining. Compared to the first embodiment, a process to store machined region information in the machined region storage 29 (step S121) is added between step S108 and step S109.

In a case where two or more parts are cut out from the workpiece 12 by laser machining, in the approach operation on a second part and thereafter, when the position in which the machining head 7 is stopped is included in a machined region whose information is stored in the machined region storage 29 in the processing in step S121, the height controller 17 determines that the approach operation is in the peripheral edge portion of the workpiece 12 in a process of step S105, and performs the approach operation using the second approach speed and the second gain that are parameters for the peripheral edge portion. Consequently, when the approach operation is performed in the machined regions 300, the nozzle 28 can be prevented from striking the workpiece 12. This can decrease the space between parts, and can increase the utilization efficiency of the workpiece 12.

Figure 16:
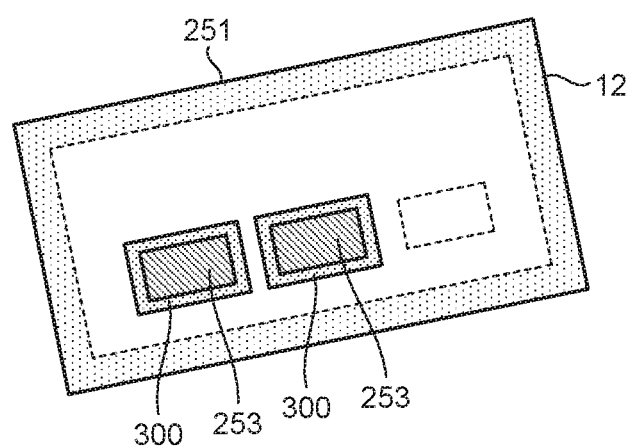
FIG. 16 is a schematic diagram illustrating an example of regions in which an approach operation is performed using parameters for a peripheral edge portion.

FIG. 16 is a schematic diagram illustrating an example of regions in which the approach operation is performed using the parameters for the peripheral edge portion. The height controller 17 regards machined regions 300 as the peripheral edge portion in addition to an outer peripheral portion 251 of the workpiece 12, and performs the approach operation using the second approach speed and the second gain. The height controller 17 includes portions 253 from which parts have fallen off by laser machining into the machined regions 300, so that the portions 253 from which the parts have fallen off are also regarded as the peripheral edge portion of the workpiece. Meanwhile, if a numerical control program is created properly, the approach operation is not performed on the portions 253 from which the parts have fallen off. Thus, even when the height controller 17 regards the portions 253 from which the parts have fallen off as the peripheral edge portion of the workpiece 12, inconvenience does not occur.

The above explanation provides an example of reducing both the approach speed and the gain when the approach operation is performed in the peripheral edge portion of the workpiece 12, compared to the case where the approach operation is performed in the non-peripheral-edge portion of the workpiece 12 as in the first embodiment. However, as in the second embodiment, it is also possible to reduce only the approach speed or only the gain.

Fourth Embodiment

Figure 17:
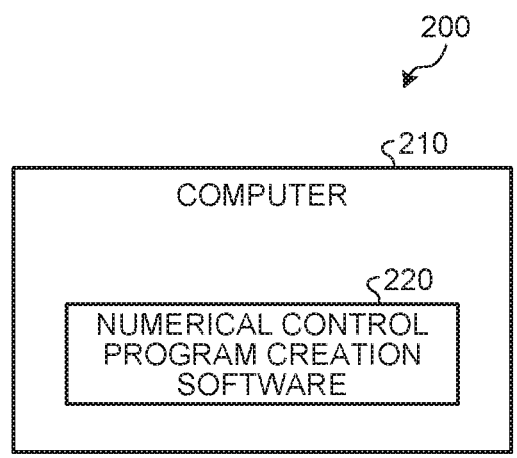
FIG. 17 is a configuration diagram of a numerical control program creation device according to a fourth embodiment of the present invention.

FIG. 17 is a configuration diagram of a numerical control program creation device according to a fourth embodiment of the present invention. A numerical control program creation device 200 is configured by a computer 210 executing numerical control program creation software 220. In other words, the computer 210 executing the numerical control program creation software 220 constitutes the numerical control program creation device 200.

Figure 18:
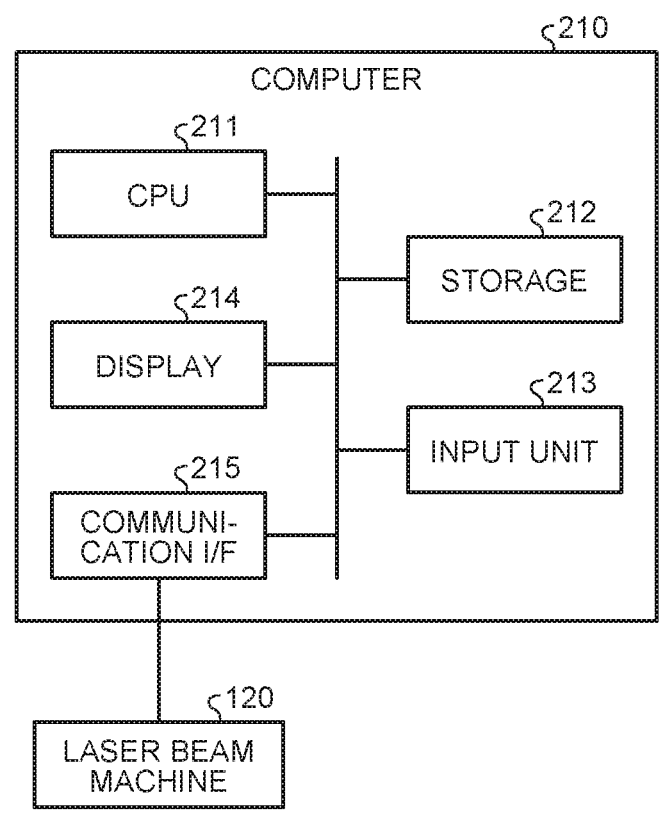
FIG. 18 is a configuration diagram of a computer applied to the numerical control program creation device.

FIG. 18 is a configuration diagram of the computer applied to the numerical control program creation device. The computer 210 includes a central processing unit (CPU) 211, storage 212, an input unit 213, a display 214, and a communication interface 215. By the CPU 211 executing the numerical control program creation software 220, a plurality of functional parts is formed on the computer 210. The storage 212 stores information necessary to create a numerical control program. The information necessary to create the numerical control program will be described below. The input unit 213 is an input device, specific examples of which include a keyboard and a mouth. The display 214 is a display device, specific examples of which include a liquid crystal display. The communication interface 215 is an interface for communication with a laser machining apparatus 120. For the laser machining apparatus 120, one with a typical device configuration without special components can be used.

Figure 19:
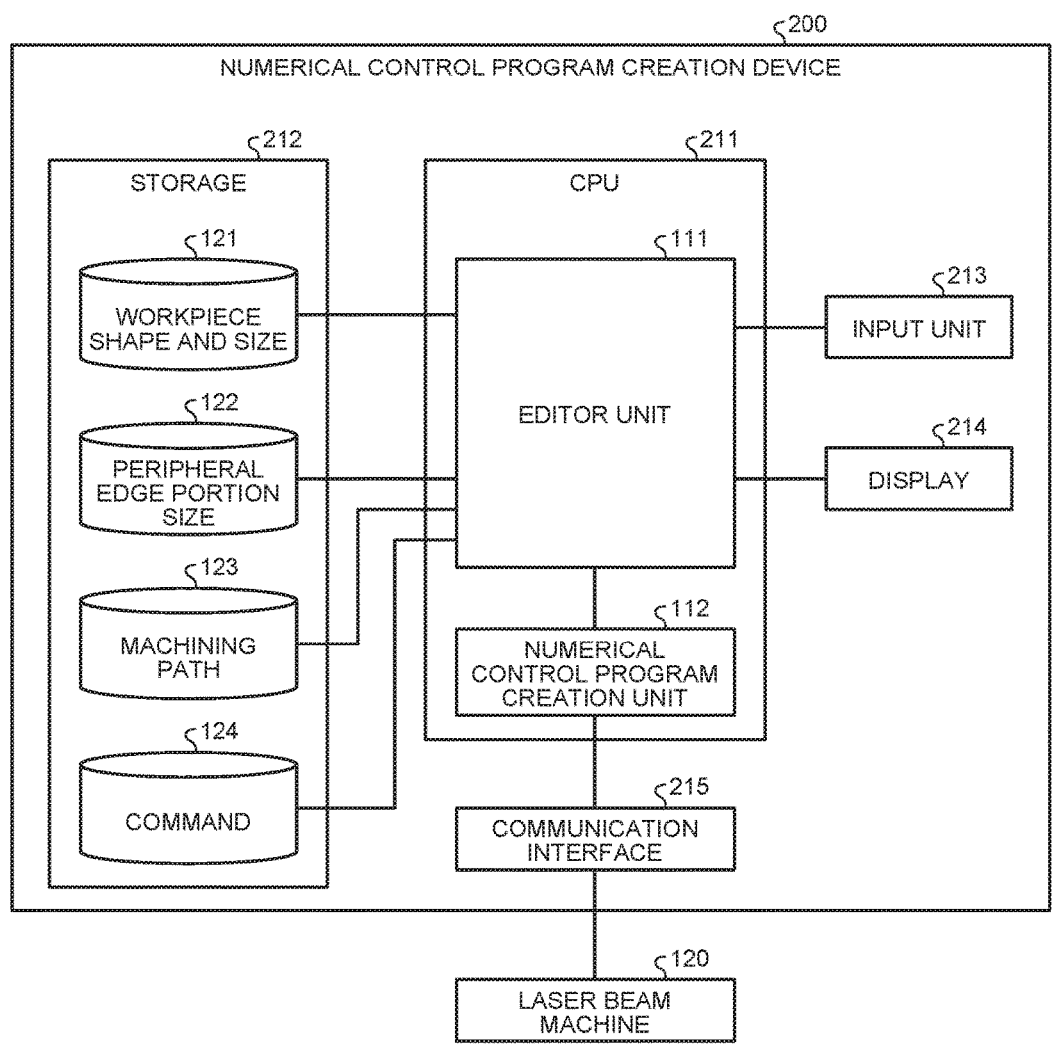
FIG. 19 is a functional configuration diagram of the numerical control program creation device.

FIG. 19 is a functional configuration diagram of the numerical control program creation device. In the CPU 211, an editor unit 111 and a numerical control program creation unit 112 are formed. The editor unit 111 causes the display 214 to display an editor screen for entering information necessary to create a numerical control program, that is, information on the shape and the size of a workpiece 12, a peripheral edge portion size, and a machining path. The editor unit 111 causes the storage 212 to store workpiece shape and size information 121, information on the peripheral edge portion size 122, and machining path information 123 entered by operation of the input unit 213. In the storage 212, commands 124 usable in the numerical control program are stored. The numerical control program creation unit 112 creates the numerical control program based on the information stored in the storage 212. The numerical control program created by the numerical control program creation unit 112 is transferred to the laser machining apparatus 120 through the communication interface 215.

Figure 20:
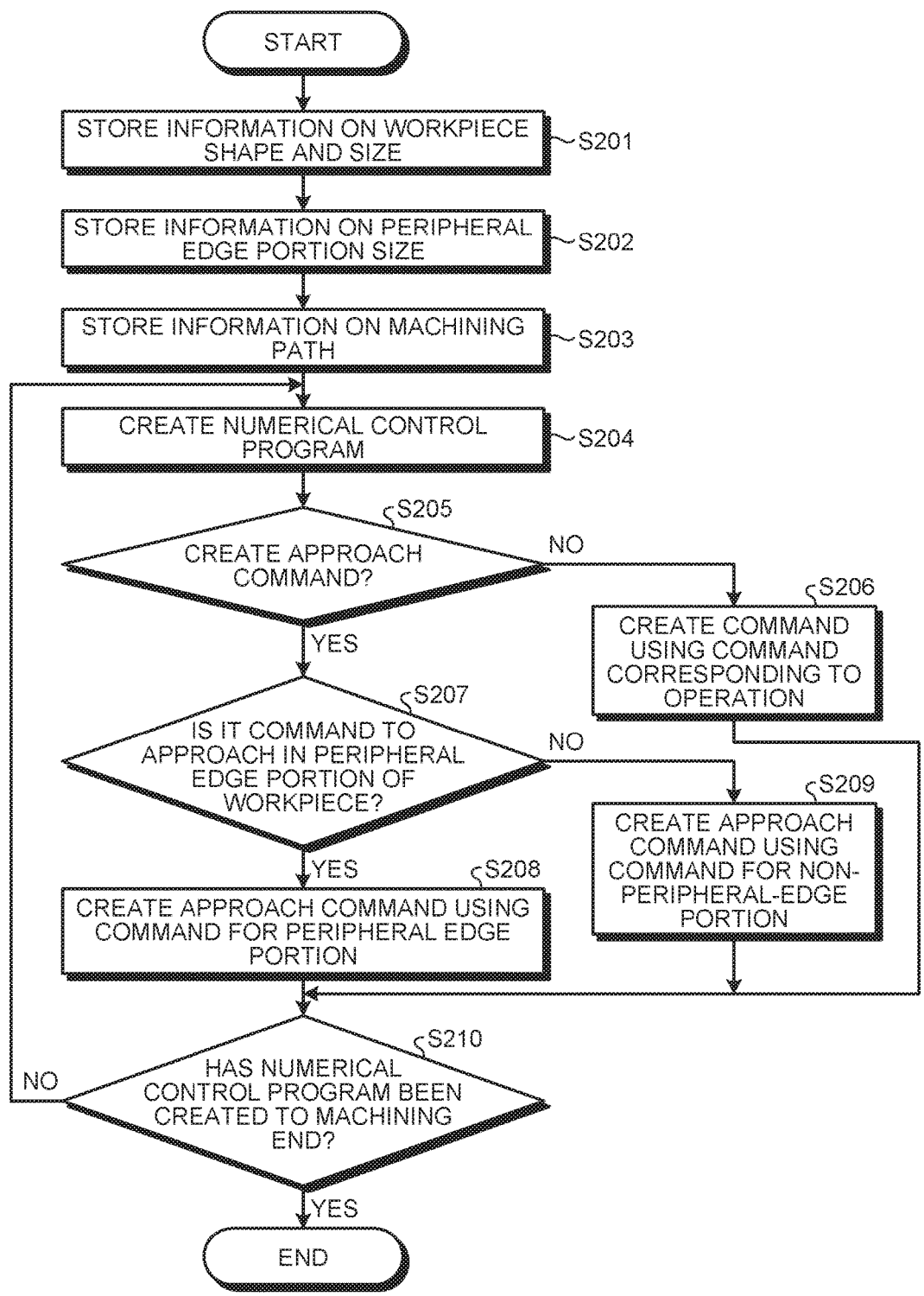
FIG. 20 is a flowchart illustrating the flow of operations of the numerical control program creation device.

FIG. 20 is a flowchart illustrating the flow of operations of the numerical control program creation device. The editor unit 111 causes the display 214 to display a screen that prompts entry of the shape and the size of the workpiece 12, and causes the storage 212 to store the workpiece shape and size information 121 entered by operation of the input unit 213 (step S201). The editor unit 111 causes the display 214 to display a screen that prompts entry of the peripheral edge portion size, and causes the storage 212 to store information on the peripheral edge portion size 122 entered by operation of the input unit 213 (step S202). The editor unit 111 causes the display 214 to display a screen that prompts entry of a machining path, and causes the storage 212 to store information on the machining path 123 entered by operation of the input unit 213 (step S203).

The numerical control program creation unit 112 creates a command of the numerical control program based on the workpiece shape and size information 121, information on the peripheral edge portion size 122, and the machining path information 123 stored in the storage 212 (step S204). When creating a command of the numerical control program, the numerical control program creation unit 112 determines whether a command to be created is an approach command or not (step S205). When the command to be created is not an approach command (step S205/No), the command is created using a command corresponding to an operation, among the commands 124 registered in the storage 212 (step S206). When the command to be created is an approach command (step S205/Yes), the numerical control program creation unit 112 determines whether it is a command to approach in a peripheral edge portion of the workpiece 12 or not (step S207). When it is a command to approach in the peripheral edge portion of the workpiece 12 (step S207/Yes), the numerical control program creation unit 112 creates the approach command using an approach command for the peripheral edge portion, among the commands 124 stored in the storage 212 (step S208). When it is a command to approach in a non-peripheral-edge portion of the workpiece 12 (step S207/No), the numerical control program creation unit 112 creates the approach command using an approach command for the non-peripheral-edge portion (step S209).

After steps S206, S208, or S209, the numerical control program creation unit 112 determines whether the numerical control program has been created to the end of machining, based on the machining path information 123 stored in the storage 212 (step S210). When the numerical control program has been created to the end of machining (step S210/Yes), the process is ended. When the numerical control program has not been created to the machining end (step S210/No), the process proceeds to step S204 to continue the creation of the numerical control program.

Figure 21:
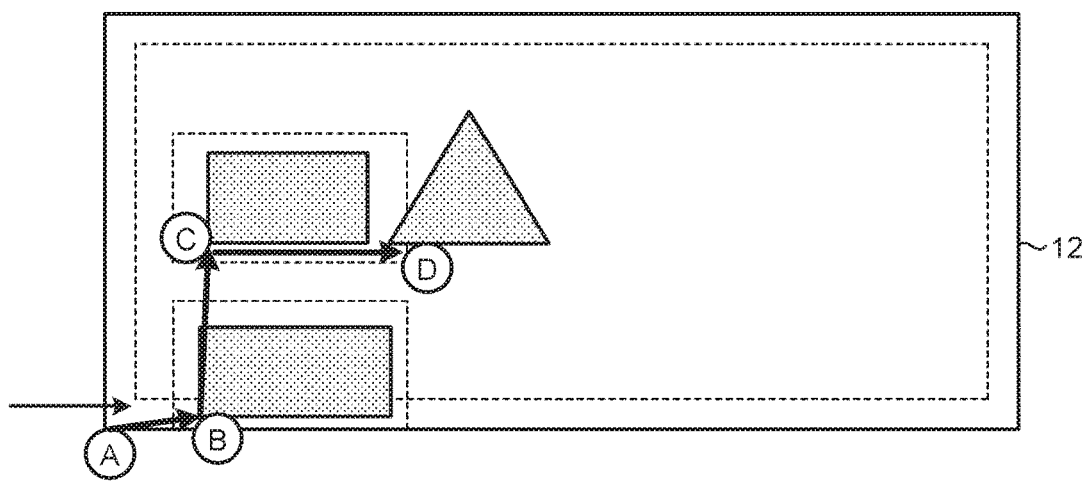
FIG. 21 is a schematic diagram illustrating an example of a machining path.

FIG. 21 is a schematic diagram illustrating an example of a machining path. In the machining path illustrated, a machining head 7 is moved to a position A that is a machining starting position, then the machining head 7 is moved to a position B located in the peripheral edge portion of the workpiece 12, and the approach operation is performed in the position B to cut out a part by laser machining. After cutting out the part, the machining head 7 is raised and moved to a position C located in the non-peripheral-edge portion of the workpiece 12, and the approach operation is performed in the position C to cut out a part by laser machining. After the part is cut out, the machining head 7 is raised, and the machining head 7 is moved to a position D located in a machined region of the part, and the approach operation is performed in the position D to cut out a part by laser machining.

When the numerical control program creation unit 112 creates a numerical control program based on the machining path illustrated in FIG. 21, since the approach operation in the position B is the approach operation in the peripheral edge portion of the workpiece 12, the numerical control program creation unit 112 creates an approach command using the command for the peripheral edge portion. Since the approach operation in the position C is the approach operation in the non-peripheral-edge portion of the workpiece 12, an approach command is created using the command for the non-peripheral-edge portion. Since the approach operation in the position D is the approach operation in the machined region, it is regarded as the approach operation in the peripheral edge portion, and an approach command is created using the command for the peripheral edge portion.

FIG. 22 is an explanatory chart illustrating an example of a numerical control program created by the numerical control program creation unit. FIG. 22 specifically illustrates the numerical control program to perform laser machining according to the machining path illustrated in FIG. 21, in which a command "M198" is used for the command to approach in the position C located in the non-peripheral-edge portion of the workpiece 12, while a command "M200" is used for the commands to approach in the position B located in the peripheral edge portion and in the position D located in the machined region of the workpiece 12. Accordingly, when executing the numerical control program, the laser machining apparatus 120 can perform the approach operation at the first approach speed and with the first gain when executing a command of M198, and can perform the approach operation at the second approach speed and with the second gain when executing a command of M200. That is, the laser machining apparatus 120 only needs to change the approach speed and the gain based on the type of a command used for an approach command.

The numerical control program creation device according to the fourth embodiment creates an approach command to use the first approach speed and the first gain when the approach operation is performed in the non-peripheral-edge portion of the workpiece 12, and creates an approach command to use the second approach speed lower than the first approach speed and the second gain lower than the first gain when the approach operation is performed in the peripheral edge portion of the workpiece 12. Therefore, only by executing the numerical control program, the laser machining apparatus 120 can change the approach speed and the gain between the peripheral edge portion and the non-peripheral-edge portion of the workpiece 12.

The above explanation provides an example of creating an approach command to reduce both the approach speed and the gain when an approach command to perform the approach operation in the peripheral edge portion of the workpiece 12 is created, compared to the approach operation in the non-peripheral-edge portion of the workpiece. However, it is also possible to create an approach command to reduce only the approach speed or only the gain when an approach command to perform the approach operation in the peripheral edge portion of the workpiece 12 is created, compared to the case where the approach operation is performed in the non-peripheral-edge portion of the workpiece.

REFERENCE SIGNS LIST 7 machining head, 10 numerical control unit, 12 workpiece, 13 main controller, 14 machine controller, 15 position controller, 17 height controller, 18 sensor data processor, 19 distance sensor, 19a detection range, 20 X servo controller, 21 Y servo controller, 22 Z servo controller, 23 X servomotor, 24 Y servomotor, 25 Z servomotor, 26 laser oscillator, 28 nozzle, 29 machined region storage, 100, 110, 120 laser machining apparatus, 111 editor unit, 112 numerical control program creation unit, 121 workpiece shape and size, 122 peripheral edge portion size, 123 machining path, 124 command, 200 numerical control program creation device, 210 computer, 211 CPU, 212 storage, 213 input unit, 214 display, 215 communication interface, 220 numerical control program creation software, 251 outer peripheral portion, 252 central portion, 253 portion from which a part has fallen off, 300 machined region.

The invention claimed is:

1. A laser machining apparatus that performs an approach operation in which a machining head having a nozzle is brought close to a workpiece to set a distance between the nozzle and the workpiece at a first distance, and emits a laser beam generated by a laser oscillator from the nozzle to the workpiece with the nozzle at the first distance from the workpiece, to cut out a part from the workpiece, the machine comprising:

a sensor to measure the distance between the nozzle and the workpiece; and a height controller to perform the approach operation such that, when the distance between the nozzle and the workpiece is more than or equal to a second distance that is larger than the first distance, the machining head is brought close to the workpiece at an approach speed, and when the distance between the nozzle and the workpiece becomes less than or equal to the second distance, the machining head is brought close to the workpiece until the distance between the nozzle and the workpiece becomes the first distance with an amount of travel of the machining head per control period set, based on a gain, smaller than that during travel at the approach speed, wherein the height controller uses a first approach speed and a first gain when performing the approach operation in a non-peripheral-edge portion of the workpiece in which the workpiece is present in an entire detection range of the sensor, and uses a second approach speed lower than the first approach speed and a second gain lower than the first gain when performing the approach operation in a peripheral edge portion of the workpiece in which the workpiece is present in a part of the detection range.

2. The laser machining apparatus according to claim 1, comprising:
machined region storage to store a machined region where the part is cut out from the workpiece, wherein
the height controller uses the second approach speed and the second gain when performing the approach operation in the machined region.

3. A laser machining apparatus that performs an approach operation in which a machining head having a nozzle is brought close to a workpiece to set a distance between the nozzle and the workpiece at a first distance, and emits a laser beam generated by a laser oscillator from the nozzle to the workpiece with the nozzle at the first distance from the workpiece, to cut out a part from the workpiece, the machine comprising:
a sensor to measure the distance between the nozzle and the workpiece; and
a height controller to perform the approach operation such that, when the distance between the nozzle and the workpiece is more than or equal to a second distance that is larger than the first distance, the machining head is brought close to the workpiece at an approach speed, and when the distance between the nozzle and the workpiece becomes less than or equal to the second distance, the machining head is brought close to the workpiece until the distance between the nozzle and the workpiece becomes the first distance with an amount of travel of the machining head per control period set smaller than that during travel at the approach speed, wherein
the height controller uses a first approach speed when performing the approach operation in a non-peripheral-edge portion of the workpiece in which the workpiece is present in an entire detection range of the sensor, and uses a second approach speed lower than the first approach speed when performing the approach operation in a peripheral edge portion of the workpiece in which the workpiece is present in a part of the detection range.

4. The laser machining apparatus according to claim 3, comprising:
machined region storage to store a machined region where the part is cut out from the workpiece, wherein
the height controller uses the second approach speed when performing the approach operation in the machined region.

5. A non-transitory computer readable storage medium containing instructions that cause a computer to execute processes to create a numerical control program for a laser machining apparatus that measures a distance between a nozzle provided at a machining head and the workpiece by a sensor, performs an approach operation such that, when the distance between the nozzle and the workpiece is more than or equal to a second distance that is larger than a first distance, the machining head is brought close to the workpiece at an approach speed, and when the distance between the nozzle and the workpiece becomes less than or equal to the second distance, the machining head is moved until the distance between the nozzle and the workpiece becomes the first distance with an amount of travel of the machining head per control period set smaller than that during travel at the approach speed based on a gain, and emits a laser beam generated by a laser oscillator from the nozzle to the workpiece with the nozzle at the first distance from the workpiece, to cut out a part from the workpiece,
the instructions including, in creating an approach command to cause the laser machining apparatus to execute the approach operation, causing the computer to perform
a process to determine whether the approach operation is performed in a non-peripheral-edge portion of the workpiece or not, based on information on a size and a shape of the workpiece, a size of a peripheral edge portion of the workpiece, and a machining path,
a process to create the approach command when the approach operation is performed in the non-peripheral-edge portion of the workpiece in which the workpiece is present in an entire detection range of the sensor, with a command to perform the approach operation using a first approach speed and a first gain, and
a process to create the approach command for when the approach operation is performed in the peripheral edge portion of the workpiece in which the workpiece is present in a part of the detection range, with a command to perform the approach operation using a second approach speed lower than the first approach speed and a second gain lower than the first gain.

6. The non-transitory computer readable storage medium according to claim 5, wherein the instructions further include causing the computer to create an approach command to cause the laser machining apparatus to perform the approach operation in a region in which the part is cut out from the workpiece, with a command to perform the approach operation using the second approach speed and the second gain.

7. A non-transitory computer readable storage medium containing instructions that cause a computer to execute processes to create a numerical control program for a laser machining apparatus that measures a distance between a nozzle provided at a machining head and the workpiece by a sensor, performs an approach operation such that, when the distance between the nozzle and the workpiece is more than or equal to a second distance that is larger than a first distance, the machining head is brought close to the workpiece at an approach speed, and when the distance between the nozzle and the workpiece becomes less than or equal to the second distance, the machining head is moved until the distance between the nozzle and the workpiece becomes the first distance with an amount of travel of the machining head per control period set smaller than that during travel at the approach speed, and emits a laser beam generated by a laser oscillator from the nozzle to the workpiece with the nozzle at the first distance from the workpiece, to cut out a part from the workpiece,
instructions including, in creating an approach command to cause the laser machining apparatus to execute the approach operation, causing the computer to perform
a process to determine whether the approach operation is performed in a non-peripheral-edge portion of the workpiece or not, based on information on a size and a shape of the workpiece, a size of a peripheral edge portion of the workpiece, and a machining path,
a process to create the approach command when the approach operation is performed in the non-peripheraledge portion of the workpiece in which the workpiece is present in an entire detection range of the sensor, with a command to perform the approach operation using a first approach speed, and a process to create the approach command for when the approach operation is performed in the peripheral edge portion of the workpiece in which the workpiece is present in a part of the detection range, with a command to perform the approach operation using a second approach speed lower than the first approach speed.

8. The non-transitory computer readable storage medium according to claim 7, wherein the instructions further include causing the computer to create an approach command to cause the laser machining apparatus to perform the approach operation in a region in which the part is cut out from the workpiece, with a command to perform the approach operation using the second approach speed.

* * * * *